May 3, 1966 P. W. BONNELL 3,249,138
FRUIT AND VEGETABLE PEELER
Filed Jan. 13, 1964 2 Sheets-Sheet 1
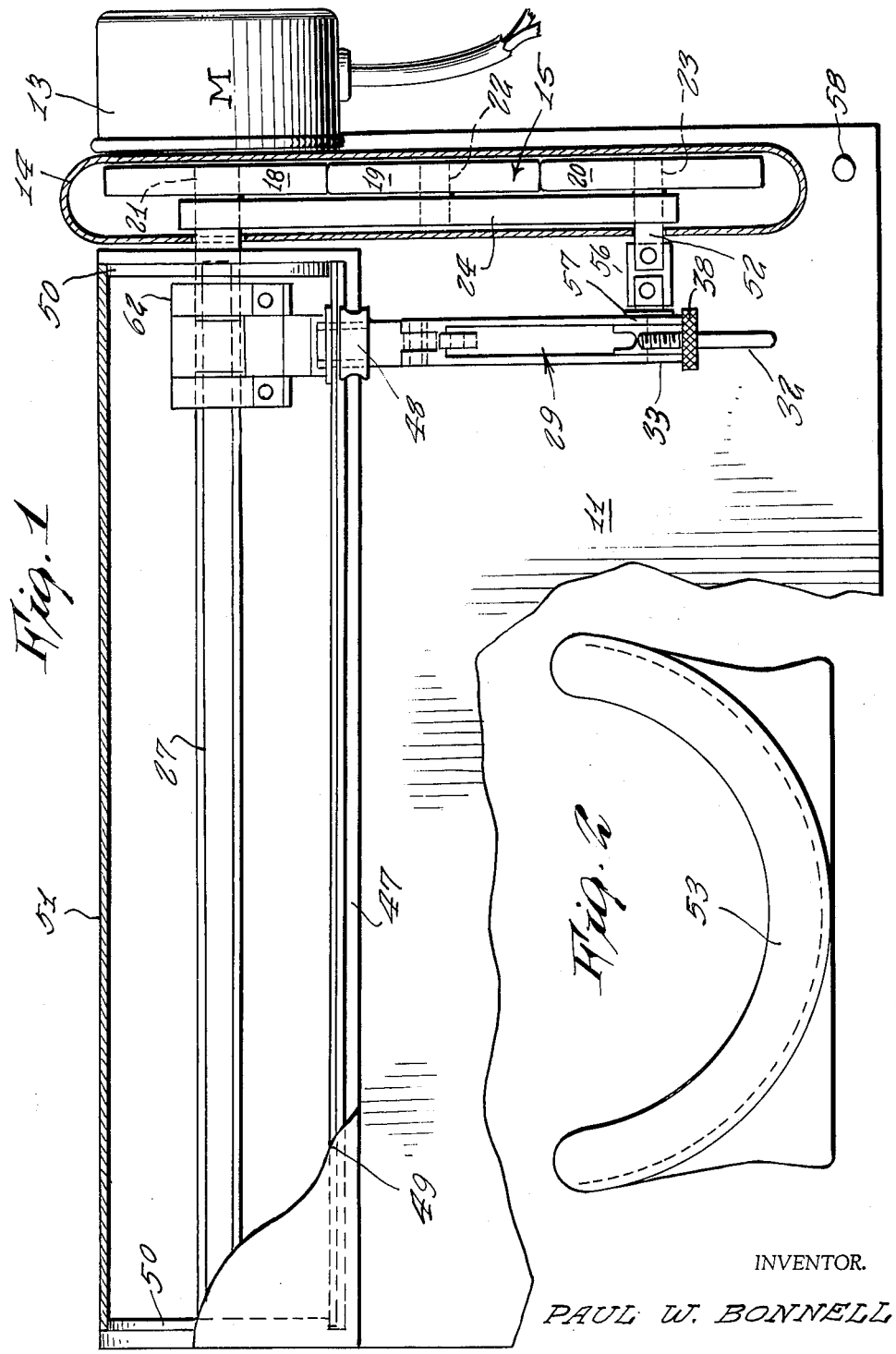
INVENTOR.
PAUL W. BONNELL

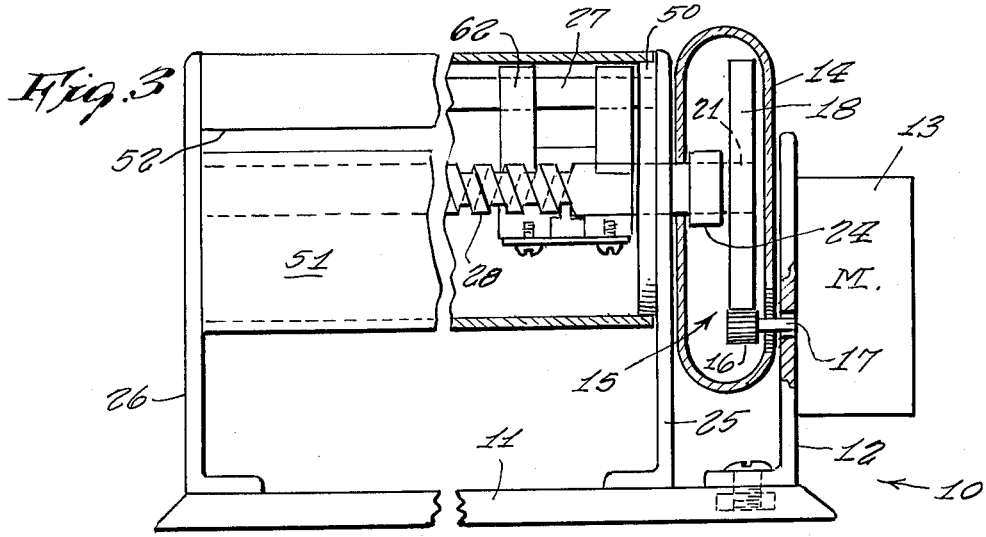
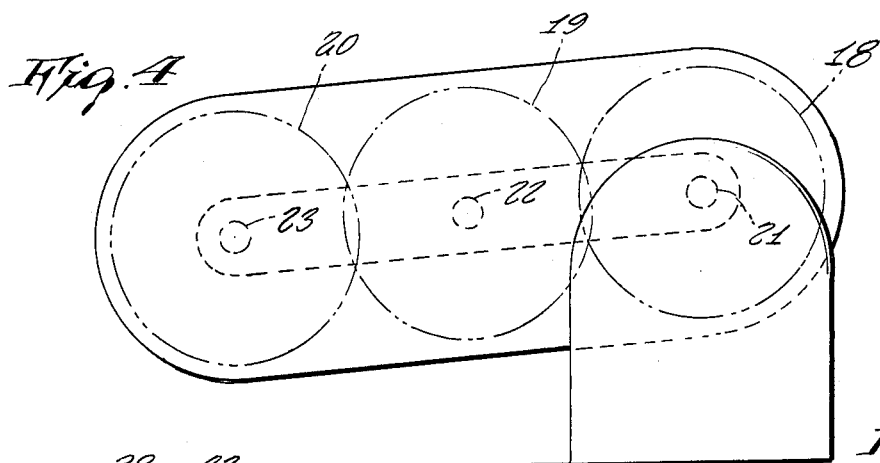
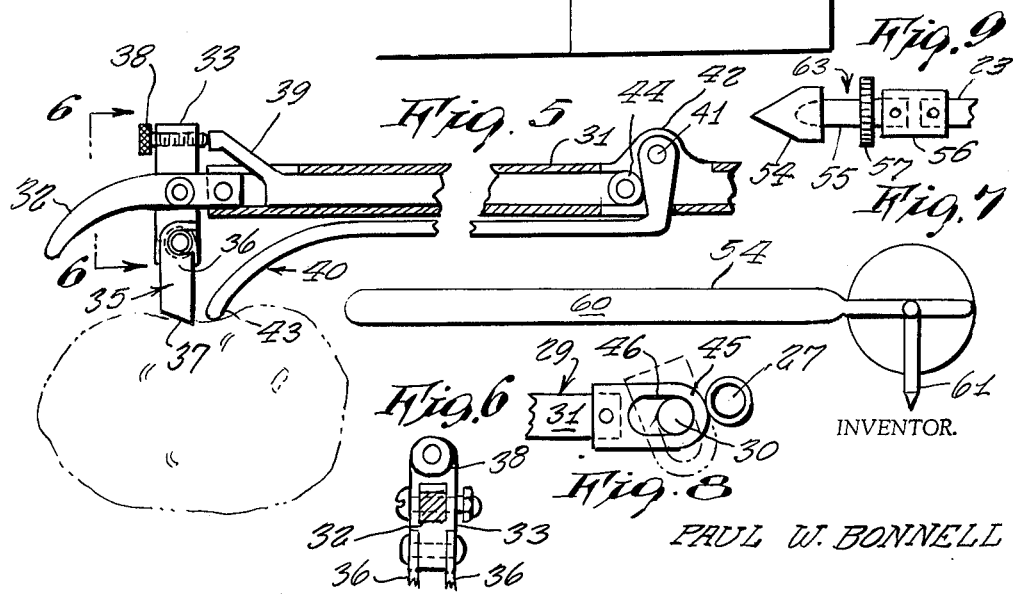

United States Patent Office 3,249,138
Patented May 3, 1966

3,249,138
FRUIT AND VEGETABLE PEELER
Paul W. Bonnell, 218 Willett Ave., Dixon, Ill.
Filed Jan. 13, 1964, Ser. No. 337,271
2 Claims. (Cl. 146—43)

My invention is directed toward a peeler for fruits and vegetables.

It is an object of my invention to provide a new and improved fruit and vegetable peeler which is electrically operated.

Another object is to provide a peeler of the character indicated wherein both the depth and the thickness of the peeling operation can be varied at will.

Still another object is to provide a new and improved peeler of the character indicated, which can be manufactured easily and inexpensively.

All of the foregoing, and still further objects and advantages of my invention will now be explained with reference both to this specification and to the drawings wherein:

FIGURE 1 is a top plan view of my invention;
FIGURE 2 is an end elevation of the trough;
FIGURE 3 is a fragmentary front elevation view;
FIGURE 4 is a right side elevation view;
FIGURE 5 is a side elevation view of the peeling mechanism;
FIGURE 6 is a view in the direction 6—6 of FIGURE 5;
FIGURE 7 is a view of a stabilizer pin for use on extra long potatoes;
FIGURE 8 shows the structure for locking the blade arm assembly in upright position; and
FIGURE 9 is a front elevation view of the potato retaining spindle.

Referring now to the drawing in detail, the numeral 10 represents a fruit and vegetable peeler according to the present invention, wherein there is a base plate 11 of generally rectangular configuration upon the upper side of which there is an uptsanding bracket 12 to the side of which an electrical motor 13 is mounted. Upon the opposite side of the bracket, a housing 14 is mounted within which there is contained a gear train 15 comprised of pinion 16 mounted on motor shaft 17 which drives a gear 18 in counter-clockwise direction. Gear 18 in turn drives gear 19 which in turn drives a gear 20; the gears 18, 19 and 20, being mounted on shafts 21, 22, and 23, respectively supported on a bearing block 24 contained within the housing. The shaft 21 is of generally elongated character, extends through the housing and its extended portion is supported upon additional upstanding brackets 25 and 26 mounted on the base plate. A guide bar 27 extends between and is mounted at each end in the brackets 25 and 26. The extended portion of shaft 21 is screw threaded as shown at 28, and a carriage block 62 is slidably mounted on rod 27 and the threaded portion of shaft 21, whereby rotational movement of threaded shaft 21 will cause the carriage block to travel along the longitudinal axis of guide bar 27 and shaft 21.

A blade arm assembly 29 is mounted pivotally free on pin 30, supported on the carriage block. The blade arm assembly comprises a forwardly projecting outer tube 31 within which an inner tube 32 is longitudinally slidable. At the outward end of tube 31, a finger hook 32 is affixed to allow manual manipulation of the blade arm assembly by an operator. A head assembly 33 is attached pivotally free to the finger hook by means of pin 34. At the lower end of the head assembly, peeler blade 35 is affixed, the blade being of generally U-shaped configuration having upstanding leg portions 36, which are connected together by a cross-portion 37 at their lower ends; the cross portion being sharpened to form a cutting edge. At the upper end of the head assembly, there is an adjustable thumb screw 38 against which a spur 39 abuts, the spur being affixed to the inner tube.

A guide and control arm 40 of generally L-shaped configuration is mounted pivotally free on a pin 41 carried on a tab 42 formed in the outer tube, the outward end 43 of arm 40 being downwardly arcuate and terminating relativley close to the peeler blade. The rear or inward end 44 of the inner tube abuts with arm 40.

It is to be noted that the head assembly sets at an angle (not shown), respective to a potato being peeled, so that the blade cutting edge can cut thereinto. Near the inward or rear end 45 of the outer tube, there is an elongated cross-slot 46 through which the pin 30 extends and supports the blade arm assembly.

The guide bar 47 extends between brackets 25 and 26, and a roller 48 carried by the blade arm assembly travels across the guide bar. The guide bar is upwardly directed near its terminal end adjacent bracket 26 as indicated at 49.

Each of the brackets 25 and 26 has a circular plate 50 on the sides adjacent each other and a cylinder 51 is mounted rotatably free around the circular plates and extends between the brackets. The cylinder serves as a housing for the threaded shaft 21 and the carriage block. An elongated slot 52 is provided in the cylinder, through which the blade arm assembly extends and along which it travels.

A trough 53 of generally semi-cylindrical configuration is placed upon the forward part of the base plate for the fruit or vegetable to lie in as it is being rotated; the axis of the trough extending parallel to the direction of travel of the peeler blade.

The shaft 23 supports a potato retaining element 63 comprised of an arrow-head shaped spindle 54 at the end of a shank 55. The opposite end of the shank is received within a sleeve 56 mounted on the end of shaft 23. A quick release pin is provided for rapid attachment or detachment of the unit. A washer 57 mounted on the shank serves as a stop for a potato mounted on the spindle.

In operative use, a potato is impaled upon the spindle. The motor is turned on by depressing a switch button 58 on the base plate. This causes the potato on the spindle to rotate. At the same time, the threaded shaft 21 is caused to rotate, thus making the carriage block travel along the shaft and carrying the blade arm assembly across the potato. The peeler blade engages the potato surface and a peel is cut from the surface thereof; the peel passing through the blade, between the legs thereof. As an eye of the potato passes under the guide and control arm, the arm (which normally rides on the potato surface) drops into the eye, thus removing support of the head assembly. This allows the top of the head assembly to move, due to the thrust of the potato upon the blade. The blade moves slightly with the potato and is drawn more deeply into the potato. The amount of this depth is determined by the size and depth of the eye. When the side of the eye again pushes the control arm upward, the head assembly is then pivoted back to normal position, lifting the blade out of the potato to normal peeling depth. Thus the control arm causes the blade to follow the contour of the potato. Near the end of its travel, the roller 48 climbs up the upwardly directed portion of the guide bar causing the blade arm assembly to be lifted into inoperative position in view that it has finished its movement across the potato. In lifted position, the blade arm assembly, due to slot 46, drops downwardly on pin 30 becoming locked in upright position between the pin 30 and guide bar 27, as shown in FIG- URE 8. In this position, the arm assembly is returned to the starting or drive end of the device. When next ready for use, the the arm is lifted upward by the finger hook and lowered to the potato.

It is to be noted that the roller 48 normally prevents the peeler blade from striking the bottom of the trough when there is no potato on the spindle.

A stabilizer 59 having an elongated handle 60 and a pointed prong 61, is provided for supporting extra long potatoes on the spindle. The prong engages the opposite end of the potato and the handle is manually supported by the operator.

It is to be further noted that as the blade arm assembly is pivoted upwardly at the end of its travel, the cylinder 51 is rotated about the circular plates 50.

Thus there has been provided a device which will efficiently peel potatoes and the other vegetables or fruit.

While various changes may be made in the detail construction, it is understood such changes will be within the spirit and scope of the present invention.

Having thus set forth my invention, what I claim as new and desire to secure by Letters Patent of the United States, is:

1. In a peeling device, the combination of a base plate, a pair of upstanding brackets mounted on said base plate, a threaded shaft supported rotatably free between said brackets, a guide bar affixed between said brackets, a carriage block carried by said threaded shaft and guide bar, said block carrying a blade arm assembly supporting a peeler blade, means for controlling the peeling depth of said peeler blade, means for supporting and rotating a potato or other vegetable or fruit below said peeler blade, drive means for rotating said supporting means, and means for automatically uplifting and locking said blade arm assembly in uplifted position after having completed a peeling operation, wherein said drive means comprises an electric motor, a gear train driven by said motor, one of said gears carrying said threaded shaft, and a second of said gears carrying a potato retaining device comprised of an arrow-headed spindle at the end of a shank in axial alignment with said second gear, and a washer serving as a potato stop mounted on said spindle, wherein said means for controlling the peeling depth, comprises an outer tube on said blade arm assembly, a head assembly mounted pivotally free on said outer tube, a U-shaped blade carried at the lower end of said head assembly, a thumb screw carried at the upper end of said head assembly, an inner tube slidably carried within said outer tube, a spur on said inner tube, said spur being in abutment with said thumb screw, an L-shaped guide and control arm supported pivotally free on said outer tube, said control arm being in abutment with one end of said inner tube, the terminal end of said control arm being relatively close to said peeler blade.

2. In a peeling device, the combination as set forth in claim 1, wherein said means to uplift and lock said blade arm assembly comprises a horizontal guide bar having an uplifted terminal end, said blade arm assembly having a roller movable on said guide bar, said blade arm assembly further having a slot through which a supporting pin mounted on said carriage block extends, said blade arm assembly in uplifted position, dropping on said pin and becoming locked in uplifted position between said pin and said guide bar.

References Cited by the Examiner
UNITED STATES PATENTS 2,299,761 10/1942 McCauley _____ 146—43
2,461,249 2/1949 Anderson _____ 146—43

ROBERT C. RIORDON, *Primary Examiner.*

WILLIE G. ABERCROMBIE, *Examiner.*